United States Patent [19]

Duijkers

[11] Patent Number: 4,636,860
[45] Date of Patent: Jan. 13, 1987

[54] PICTURE DISPLAY DEVICE COMPRISING A NOISE DETECTOR

[75] Inventor: Peter A. Duijkers, Nijmegen, Netherlands

[73] Assignee: U.S. Philips Corporation, New York, N.Y.

[21] Appl. No.: 639,164

[22] Filed: Aug. 9, 1984

[30] Foreign Application Priority Data

Aug. 26, 1983 [NL] Netherlands .................. 8302984

[51] Int. Cl.$^4$ .............................................. H04N 5/04
[52] U.S. Cl. ..................................... 358/148; 358/158
[58] Field of Search ............... 358/148, 155, 153, 157, 358/158, 36, 167

[56] References Cited

U.S. PATENT DOCUMENTS 4,376,952 3/1983 Troiano ................................. 358/166
4,488,170 12/1984 Nillesen ............................... 358/148
4,496,978 1/1985 Sakamoto et al. ................... 358/155

Primary Examiner—James J. Groody
Assistant Examiner—David E. Harvey
Attorney, Agent, or Firm—Thomas A. Briody; Jack Oisher; William J. Streeter

[57] ABSTRACT

A picture display device having a synchronizing signal separating stage, a field synchronizing signal separating stage, a line synchronizing circuit and a field synchronizing circuit. The picture display device also has a noise detector for detecting noise in an incoming video signal and for changing over portions of the picture display device in dependence on the detected noise signal. The noise detector includes a noise separating stage for amplifying the noise present during the occurrence of a sampling pulse, which pulse is derived from a line reference signal produced by the line synchronizing circuit. The noise detector further includes a counting arrangement for counting the number of times the noise signal, amplified in the noise separating stage, exceeds a predetermined value and for producing a change signal when this number found during the counting operation has reached a predetermined value during a predetermined number of line periods in the field trace period.

11 Claims, 3 Drawing Figures

PICTURE DISPLAY DEVICE COMPRISING A NOISE DETECTOR

BACKGROUND OF THE INVENTION

The invention relates to a picture display device comprising a video processing stage for supplying an incoming video signal containing at least a composite synchronizing signal, a synchronizing signal separating stage connected to the video processing stage for supplying the composite synchronizing signal, a line synchronizing circuit coupled to the synchronizing signal separating stage for generating a line reference signal which is substantially synchronous with the line synchronizing signal present in the composite synchronizing signal, and a noise detector coupled to the video processing stage for detecting noise in the incoming video signal and for changing-over portions of the picture display device in dependence on the detected noise signal, this noise detector comprising a noise separating stage for differentiating the incoming video signal and for amplifying the resultant noise signal during the occurrence of a line signal, and also an output stage for supplying a change-signal derived from the amplified noise signal.

Such a picture display device is disclosed in European Patent Application No. 59,379. In the television receiver described therein a number of portions of the receiver are changed so as to improve the displayed picture when a large amount of noise is received. To that end, the incoming video signal is delayed before it is applied to the synchronizing signal separating stage. The line synchronizing signal is generated with the aid of the delayed signal. During the occurrence of the line synchronizing signal, the noise obtained by differentiation is amplified and thereafter, the amplified noise signal is subjected to half-wave rectification. This results in a d.c. voltage. The value of this voltage depends on the quantity of noise contained in the video signal. When a predetermined value is exceeded, this voltage provides the change. The differentiation of the video signal produces disturbing pulses during the occurrence of the edges of the non-delayed line synchronizing pulses. Thanks to the delay, the disturbing pulse during the occurrence of the leading edge is removed, whereas the disturbing pulse caused by the trailing edge can be removed by half-wave rectification.

If a great deal of noise is present then it may, happen that the synchronizng signal separating stage in the prior art arrangement is not capable of producing an adequate line signal for the noise separating stage. The weak line signal obtained may be shifted in time relative to the incoming video signal, for example, due to reflections, so that no proper distinction can be made between the noise and the higher components of the video spectrum, i.e. luminance and, more specifically, chrominance components, with the result that the noise detector does not supply reliable information. A large-amplitude disturbing pulse occurring during the line trace period may also produce a signal for the noise separating stage.

SUMMARY OF THE INVENTION

It is an object of the invention to provide a picture display device of the above-described type, the time interval in which the noise separating stage is operative being determined in a reliable way. To this end the arrangement according to the invention is characterized in that connected to the noise separating stage there is a pulse shaper which is coupled to the line synchronizing circuit for generating a sampling pulse for making the noise separating stage operative during the occurrence of this pulse, this sampling pulse being derived from the line reference signal and, in operation, occurring during the line synchronizing period, the duration of the sampling pulse being shorter than the duration of the line synchronizing period.

The invention is based on the recognition that on reception of a large amount of noise the line synchronizing circuit is also capable, thanks to the flywheel effect thereof, of producing a stable and reliable line reference signal and consequently, a reliable sampling pulse, on the understanding that this pulse occurs each line period in an interval which is fixed in time relative to the incoming video signal, in which interval this signal does not contain luminance and chrominance components.

The distinction between noise and video signal components is further enhanced in that the arrangement according to the invention, is further characterized by an integrator for suppressing the high-frequency components of the incoming video signal applied to the noise separating stage.

Advantageously, an arrangement comprising a field synchronizing signal connected to the synchronizing signal separating stage for deriving the field synchronizing signal present in the composite synchronizing signal obtained and connected to the field synchronizing signal separating stage a field synchronizing circuit for generating a field reference signal which is substantially synchronous with the incoming field synchronizing signal, is characterized in that the noise detector also comprises a counting device connected to the noise separating stage and to the field synchronizing circuit for counting the number of times the noise signal amplified by the noise separating stage exceeds a predetermine value and for causing a change-over signal to be generated by the output stage when the number of times counted during a predetermined number of line periods in the field trace period has reached a predetermined value. This measure is further based on the recognition that it is advantageous to have the presence of noise determined during a predetermined period of time. This results in a reliable criterion.

The arrangement according to the invention may be characterized in that the counting device produces the change-over signal after the situation in which the number, found during the counting operation has reached the predetermined value during a predetermined number of line periods in the field trace period, repeats itself during a predetermined number of consecutive field periods.

Improved operation of the noise detector is obtained if the arrangement is characterized in that the output stage is connected to the noise separating stage for increasing the gain factor thereof in the presence of the change-over signal.

DESCRIPTION OF THE DRAWINGS

The invention will now be described in greater detail, by way of example, with reference to the accompanying drawings. Herein.

DESCRIPTION OF THE PREFERRED EMBODIMENT

Figure 1:
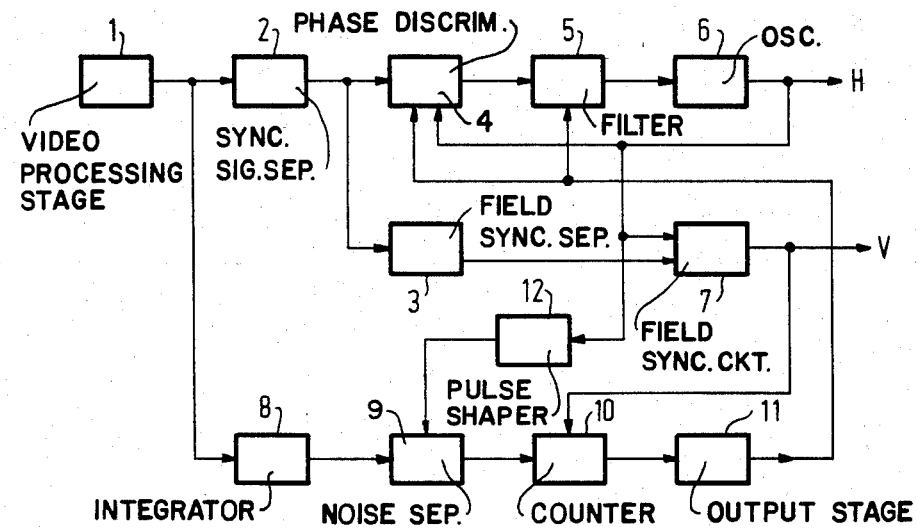
FIG. 1 shows a block diagram of a portion of a picture display device, for example a television receiver, according to the invention.

In FIG. 1 reference numeral 1 illustrates a video processing stage which applies a video signal to a synchronizing signal separating stage 2. Stage 1 comprises a plurality of circuits in which an incoming video signal is amplified and processed in known manner. The signal from stage 1 includes a composite synchronizing signal which is present at the output of stage 2 and is applied to a field synchronizing signal separating stage 3 and to a line synchronizing circuit which comprises a phase discriminator 4, a loop filter 5 and a line oscillator 6. Phase discriminator 4 determines the phase difference between the line synchronizing signal contained in the composite synchronizing signal and the line reference signal generated by oscillator 6 and in dependence on the phase difference measured, generates a voltage which is smoothed by filter 5. The smoothed voltage is applied to oscillator 6 for controlling the frequency and/or phase thereof. In the final state of the phase control loop formed by elements 4, 5 and 6, the reference signal has substantially the line frequency, i.e. the nominal frequency of the incoming line synchronizing pulses, namely 15.625 kHz for the European standard, and substantially the same phase as these pulses. The reference signal is applied to stages, not shown, in which it is further processed in known manner for the horizontal deflection in a picture display tube.

At the output of the field synchronizing signal separating stage 3, the field synchronizing signal present in the composite synchronizing signal is available for application to a field synchronizing circuit 7. Circuit 7 comprises, for example, a frequency dividing circuit to which the signal from line oscillator 6 is applied for dividing the frequency thereof, as a result of which, in the nominal state of line phase control loop 4, 5, 6, a signal having the field frequency, i.e. 50 Hz for the European standard, is obtained, which is compared to the incoming field synchronizing signal. The field-frequency reference signal generated by circuit 7 has substantially the correct phase with respect to the field synchronizing signal and is applied to stages, not shown, for further processing for the vertical deflection in the picture display tube.

Everything described in the foregoing is of a known type. Other known stages may be present. Such a stage is, for example, a synchronizing detector with which coincidence between the incoming line synchronizing signal and the signal from oscillator 6 is determined for switching the elements of control loop 4, 5, 6, with the object of accelerating pull-in of the loop and also to increase the insensitivity to noise in the pulled-in state. For this purpose, the sensitivity of phase discriminator 4 and the time constant of filter 5 may then be given other values.

The picture display device, of which the abovementioned stages form part, also comprises a noise detector comprising an integrator 8, a noise separating stage 9, a counting device 10 and an output stage 11. The video signal present at the output of stage 1 is applied to integrator 8 which is in the form of a low-pass filter. By means thereof, the high-frequency components are removed from the video signal. The signal obtained comprises few luminance and chrominance components, while the noise components are somewhat attenuated and the synchronizing pulses are substantially not influenced. The signal from line oscillator 6 is also applied to a pulse shaper 12 for producing a sampling pulse. This pulse occurs during a time interval located, in the synchronized state of the line synchronizing circuit, within the line synchronizing interval in the incoming video signal. Contrary to the line synchronizing pulse, the sampling pulse is free from noise and interference, and the edges thereof have a well-defined position in the time. The sampling pulse is applied to noise separating stage 9 for making this stage operative. The signal coming from integrator 8 is first differentiated and thereafter the signal obtained is amplified by stage 9 during the occurrence of the sampling pulse. Thanks to the described measures, the amplified signal contains only noise components. This noise signal produces a pulse which is applied to counting device 10.

Figure 2:
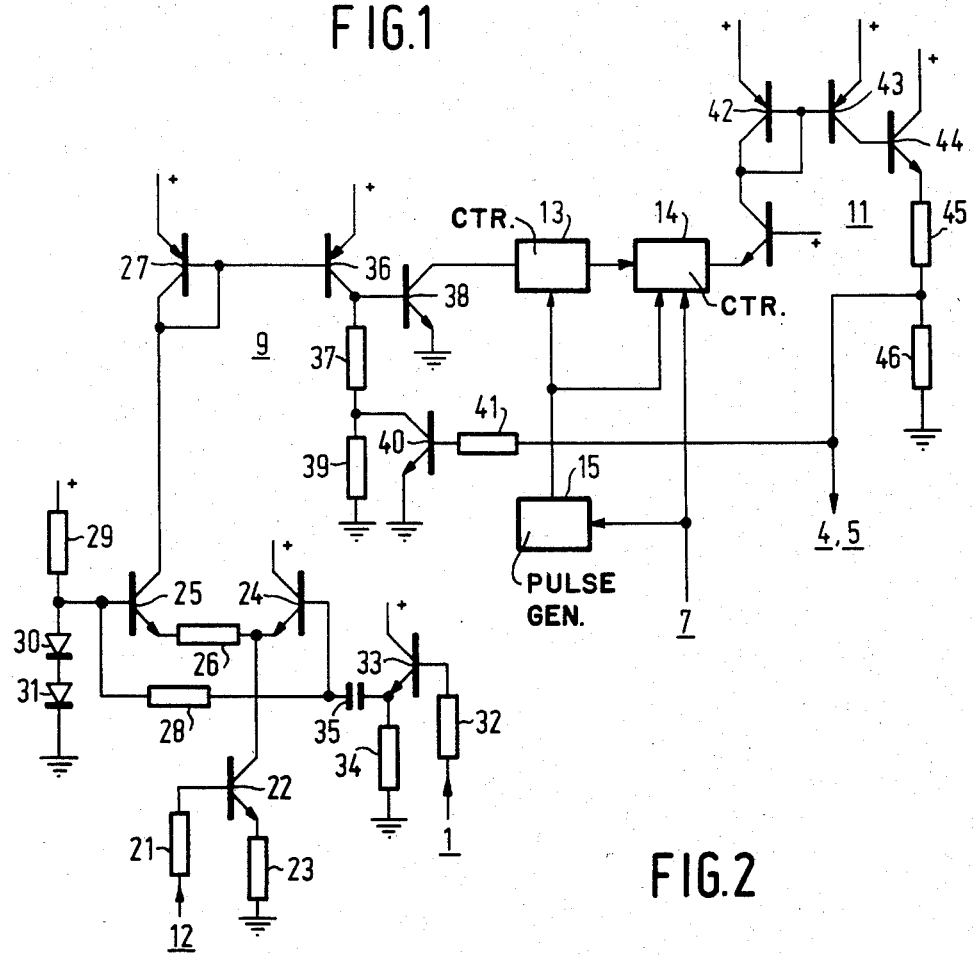
FIGS. 2 and 3 show some details of the arrangement of FIG. 1.

FIG. 2 shows a possible embodiment of noise separating stage 9. The sampling pulse produced by pulse shaper 12 is applied to the base of an npn-transistor 22 via a kOhm resistor 21. Because of the action of the line phase control loop having elements 4, 5 and 6, it is ensured that an edge of the signal from oscillator 6 occurs approximately at the center instant of a line synchronizing pulse synchronized therewith. By means of pulse shaper 12, a positively going pulse is produced which, after the edge, has a duration of 1 to 1.5 $\mu$s. The oscillator 6 may alternatively be in form of a sawtooth generator having a short flyback, pulse shaper 12 generating a pulse during the flyback period. The pulse from pulse-shaper 12 renders transistor 22 conductive. The emitter of transistor 22 is connected to ground via a 700$\Omega$ resistor 23, while the collector is connected to the emitter of an npn transistor 24. The collector of transistor 24 is connected to the positive pole of a 12 V power supply whose negative pole is connected to ground. The emitter of a further npn transistor 25 is connected to the emitter of transistor 24 via a 2 k$\Omega$ resistor 26. The collector of transistor 25 is connected to the base and to the collector of a pnp transistor 27 whose emitter is connected to the supply voltage. The base of transistor 25 is connected to a 14.7 k$\Omega$ resistor 28, whose other side is connected to the base of transistor 24, and to the junction between a 10 k$\Omega$ resistor 29, whose other side is connected to the supply voltage, and two diodes 30 and 31 arranged in series with the same forward directions. The anode of diode 30 is connected to the base of transistor 25 while the cathode of diode 31 is connected to ground.

Integrator 8 comprises a 1 k$\Omega$ series resistor and a parallel capacitor of 150 pF and affects the synchronizing pulses to a small extent. Although different from FIG. 1, integrator 8 can be included in stage 1, that is to say integration can be effected before the output of stage 1. The resultant slightly integrated video signal is a positive going signal, that is to say the synchronizing signal has a lower voltage level than the luminance signal. This slightly integrated video signal is applied, via a 2 k$\Omega$ resistor 32, to the base of an npn transistor 33, whose collector is connected to the supply voltage, while the emitter is connected to a 3.5 k$\Omega$ resistor 34, whose other side is connected to ground. An 18 pF capacitor 35 is arranged between the emitter of transistor 33 and the base of transistor 24. From this it can be seen that transistor 33 and resistor 34 constitute a separating stage between integrator 8 and stage 1, respectively, and the differentiator formed by capacitor 35 and resistor 28.

The base and the collector of transistor 27 are also connected to the base of a further pnp transistor 36 whose emitter is connected to the supply voltage, whereas the collector is connected to a 10 kΩ resistor 37 and to the base of an npn transistor 38, whose emitter is connected to ground. The other side of resistor 37 is connected to a 7.5 kΩ resistor 39 and to the collector of an npn transistor 40. The other terminal of resistor 39 and also the emitter of transistor 40 are connected to ground.

Transistor 22 forms a current source which is only operative during the occurrence of the sampling pulse applied thereto. In the sampling interval, the emitter current of transistor 25 flows through resistor 26, which current, because of the high value of resistor 26 and the low value of the internal resistance of transistor 24, is predominantly determined by the high-frequency signal applied via capacitor 35. Because of the mirror inverting action by means of transistors 27 and 36, a current which has substantially the same value as the current through resistor 26 flows through resistor 37. If transistor 40 is kept in the conducting state, in a way to be described still further, by the current through a 7.5 kΩ resistor 41, then it is clear that the noise signal present at the base of transistor 24 in the sampling interval is also present at the collector of transistor 36, but with a gain which is equal to the ratio between the values of resistors 37 and 26, that is to say 5 times in this example. A noise signal at the base of transistor 24 with an amplitude of at least approximately 120 mV consequently produces a signal of at least approximately 0.6 V at the base of transistor 38, which is sufficient to render this transistor conductive. Consequently, a pulse-shaped current flows through transistor 38. If the noise signal is less than approximately 120 mV, then transistor 38 remains cutoff during the sampling interval.

The current through transistor 38 produces at the collector a negatively-going voltage transient which is conveyed to counting device 10. This counting device 10 comprises two counters 13 and 14 and a pulse generator 15. Generator 15 receives the control signal from field synchronizing circuit 7 and produces a window signal for counters 13 and 14. The window signal has a duration of 16 line periods and starts approximately 4 ms after the end of the field blanking interval, so it is located in the visible portion of the picture. During the occurrence of this window signal, counter 13 counts the number of times transistor 38 conducts and consequently the number of times stage 9 measures noise. If this number is equal to or greater than four, counter 13 stops counting causing a pulse to be applied to counter 14. The latter counter is enabled by the field signal from circuit 7 and subsequently counts to two consecutive fields. Output stage 11 comprises a current mirror circuit including two pnp transistors 42 and 43 and is connected to counter 14. As soon as counter 14 has counted to two, the level at its coutput becomes high so that no current flows through transistor 42 and consequently through transistor 43. The base of an npn transistor 44 is connected to the collector of transistor 43 and the collector is connected to the supply voltage, whereas a 7.5 kΩ resistor 45 and a 13.9 kΩ resistor 46 are arranged in series between the emitter and ground. In the described circumstances, transistor 44 is in the non-conducting state. So the voltage at the emitter is zero. If counter 13 has counted to less than four and/or counter 14 has counted to less than two then, in contradistinction therewith, the level at the output of counter 14 is low, so that transistors 42, 43 and 44 conduct and, consequently, the emitter of transistor 44 carries a positive voltage.

The junction of resistors 45 and 46 carries the output voltage of the noise detector. This junction is connected to phase discriminator 4 and filter 5 for changing their operation in known manner. Further portions of the picture display device can be changed. Then the change by means of the noise detector can be combined with a change controlled by the above-mentioned synchronization detector. The European Patent Application No. 59,379 describes such switcheable portions and also such a combination. The junction is also connected to that terminal of resistor 41 which is not connected to the base of transistor 40. The last-mentioned measure has for its object to improve the operation of the noise detector somewhat, thanks to a hysteresis effect. As long as the condition that counter 13 has counted to four and counter 14 has counted to 2 has not been satisfied, transistor 40 is conductive and stage 9 has a gain factor of 5. If the condition has indeed been satisfied, then transistor 40 is non-conducting, causing the value of the emitter-resistor of transistor 36 to be increased to 17.5 kΩ and the gain factor of stage 9 to be increased to approximately 8.8. Thus, it is sufficient for stage 9 to measure a smaller quantity of noise to render transistor 38 conductive. This measure accomplishes that when noise is detected in a measuring period, the noise detector has an increased sensitivity during the subsequent measuring period and thus it is easier for the detector to maintain the line synchronizing circuit in the state in which it has an improved immunity to noise.

From the foregoing, it can be seen which standard is used for the decision that noise is indeed received. Firstly noise is measured in a short interval in which no video signal is present, it being a condition that the amplitude of the noise must exceed a predetermined threshold value to be taken into consideration, this threshold value being lower for the case in which the presence of noise was already determined previously. Since noise usually contains high-frequency components such components will certainly occur in the interval. Secondly, the number of times is counted in which noise was measured during a predetermined number of line periods, which line periods occur a certain time after the beginning of the field trace period, it being a condition that the counter exceeds a predetermined value. The position in the field trace period in which these line periods are located is not critical, although the measurement must not be effected during the field blanking period. A reason therefor is that some types of video recording devices generate, during this period, an encoding signal which might disturb the operation of the noise detector and of the line synchronizing circuit. Thirdly, the detected situation must repeat itself during a predetermined number of consecutive field periods. In the foregoing a description is given of the choices made in the described embodiment with respect to the amplitude of the noise, the duration of the window signal, the count of the line periods and the count of the field periods. It will be obvious that these choices were determined from actual practice and that other choices might have been made. It would, for example, be possible to omit counter 14 so that noise is only measured during one field period or to opt for a longer or shorter duration for the window signal.

In the foregoing, noise separating stage 9 is described as a keyed amplifier. It will be obvious that this stage may be replaced by a sample-and-hold circuit with the same function. Generator 15 is not described in detail as it may be of a known construction. If field synchronizing circuit 7 comprises a frequency dividing circuit for counting line periods, then generator 15 can be of a simple construction for generating the window signal in that a certain number is counted for the leading edge and a second number for the trailing edge of this signal. Elements 13, 14 and 15 may be replaced by a microcomputer, while the place and the duration of the window signal, the maximum number of line periods and also the maximum number of field periods for the noise detection can be programmed optionally.

Figure 3:
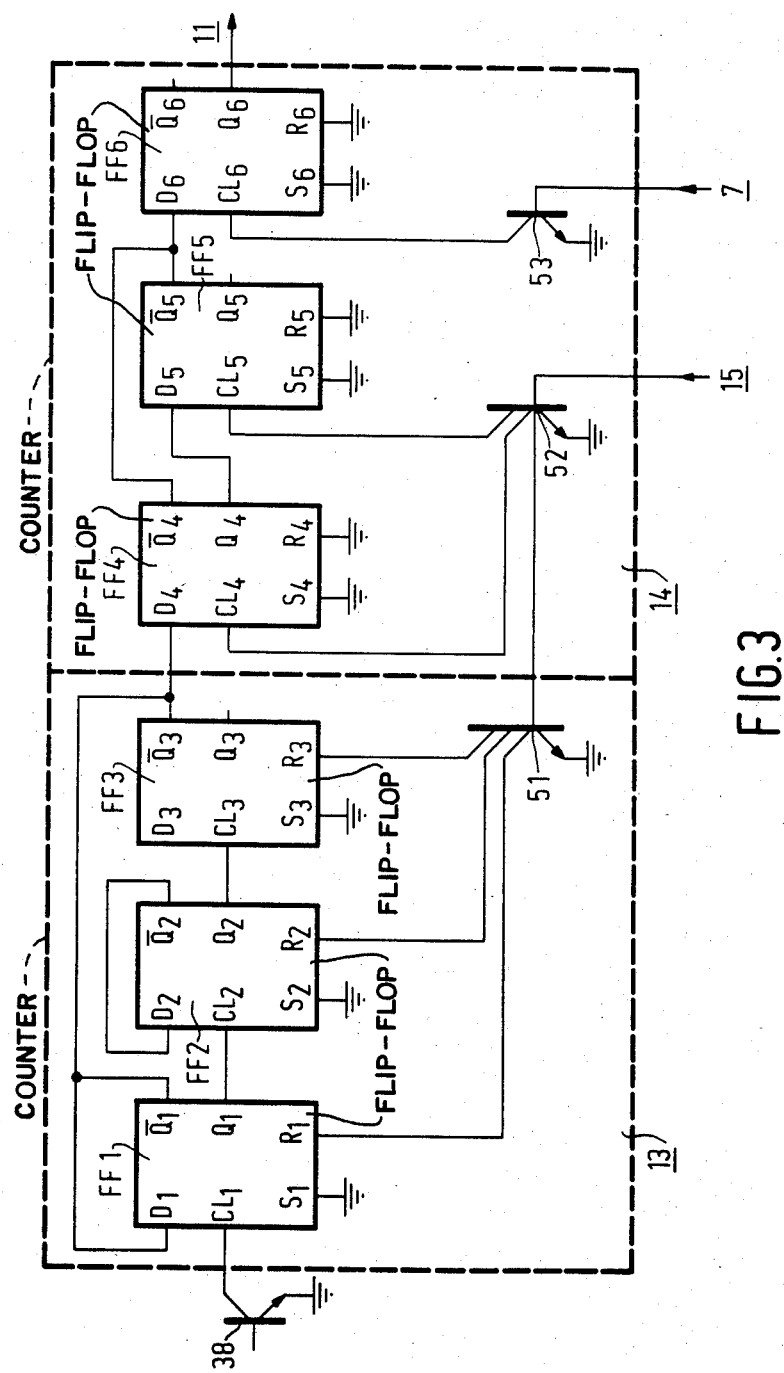

FIG. 3 shows a possible embodiment of counters 13 and 14. These counters comprise flip-flops produced in accordance with the integrated injection logic ($I^2L$) technique. Counter 13 comprises three flip-flops FF1, FF2 and FF3 which can be reset by the window signal via a transistor 51, whereas the set inputs S1, S2 and S3 are connected to ground. The clock input $CL_1$ of flip-flop FF1 is connected to the collector of transistor 38, while the output $Q_1$ is connected to the clock input $CL_2$ of flip-flop FF2. The output $Q_2$ of flip-flop FF2 is connected to the clock input $CL_3$ of flip-flop FF3. The inverting output $\overline{Q}_1$ of flip-flop FF1 is connected to the D-input $D_1$ of the same flip-flop and also to the inverting output $\overline{Q}_3$ of flip-flop FF3. Similarly, the inverting output $\overline{Q}_2$ of flip-flop FF2 is connected to the D-input $D_2$ of the same flip-flop. The D-input $D_3$ of flip-flop FF3 carries a logic 1.

The window signal accomplishes that $Q_1=Q_2=0$ and $\overline{Q}_3=1$. Herein the reference symbols denote the logic signals at the similarly denoted terminals. Now $D_1=D_2=1$. If the collector of transistor 38 becomes low, then $Q_1=1$. At the subsequent pulse, $Q_1$ becomes zero, causing $Q_2$ to become a logic 1. The third impulse causes flip-flop FF1 to change state again, but $Q_2$ becomes zero at the fourth pulse only, when $Q_1$ becomes zero, in response to which $\overline{Q}_3$ also becomes zero. As a result thereof, also $D_1$ becomes zero. Subsequent clock pulses at input $CL_1$ will not have any influence on $\overline{Q}_3$, as $Q_1$ is and remains zero.

Counter 14 comprises three flip-flops FF4, FF5 and FF6 of which both the set and the reset inputs S4, S5, S6 and R4, R5, R6, respectively, are connected to ground. The window signal is applied as a clock signal to flip-flops FF4 and FF5 via a transistor 52. The D-input $D_4$ of flip-flop FF4 is connected to the output $\overline{Q}_3$ of flip-flop FF3, while the D-input $D_5$ of flip-flop FF5 is connected to the output $Q_4$ of flip-flop FF4. The inverting outputs $\overline{Q}_4$ and $\overline{Q}_5$ of flip-flops FF4 and FF5, respectively, are interconnected. When the circuit is made operative, flip-flops FF4 and FF5 keep counting until $Q_4$ and $Q_5$ have both become a logic 1. If counter 13 counts to less than four, then $\overline{Q}_3=D_4=1$, so that $Q_4$ remains a 1 while flip-flop FF5 does not change state either. As long as $\overline{Q}_3$ remains a 1, this state is not changed at the occurrence of the subsequent window signals. If counter 13 counts, in contradistinction thereto, to four then $\overline{Q}_3=D_4=0$. At the occurrence of the window signal, it is obtained that $Q_4=D_5=0$, while $Q_5$ does not change and consequently remains 1. Since $\overline{Q}_5$ is zero, also $\overline{Q}_4$ is zero but this does not influence $Q_4$. At the occurrence of the subsequent window signal, that is to say one field period later, $Q_4$ remains a logic 0 but $Q_5$, which was a logic 1 becomes zero, causing both $\overline{Q}_4$ and $\overline{Q}_5$ to be 1. As long as $\overline{Q}_3$ is zero, subsequent clock pulses at inputs $CL_4$ and $CL_5$ will not have any influence on $\overline{Q}_5$. If $\overline{Q}_3$ becomes a logic 1 after the occurrence of the first window signal, then $Q_4$ becomes an 1 at the occurrence of the second window signal, resulting in $\overline{Q}_4$ and $\overline{Q}_5$ becoming zero. This is the original state.

From the foregoing, it is to be seen that the signal at output $\overline{Q}_5$, when noise is measured, does not become a logic 1 unit after two consecutive field periods. This information can be used as the output signal of the noise detector. In the embodiment of FIG. 3, a delay has been adopted for, more specifically by means of flip-flop FF6. A signal originating from circuit 7 is applied as a clock signal to this flip-flop via transistor 53, while the D-input $D_6$ is connected to the output $\overline{Q}_5$ of flip-flop FF5. The output $Q_6$ of flip-flop FF6 is the output of counter 14 and is connected to the collector and to the base of transistor 42 via a transistor which operates as a current source. When no noise is measured, the situation is maintained that $D_6=\overline{Q}_5=0$ and $Q_6$ remains low, causing transistor 42 to carry current. If the presence of noise is detected by stage 9 and flip-flops FF1 to FF5, inclusive, then $D_6$ becomes a logic 1. At the occurrence of the subsequent field signal at clock input $CL_6$, $Q_6$ becomes high, causing transistor 42 to be cut-off. In this way it is obtained that the change-over actions controlled by the noise detector are effected during a field change, that is to say at an instant at which no visible signal is displayed. This measure must be considered as a refinement. The same applies to the above-described hysteresis.

What is claimed is:

1. A picture display device comprising
   a video processing stage for supplying an incoming video signal containing at least a composite synchronizing signal;
   a synchronizing signal separating stage connected to the video processing stage for separating the composite synchronizing signal from the incoming video signal;
   a line synchronizing circuit coupled to the synchronizing signal separating stage for generating a line reference signal which is substantially synchronous with a line synchronizing signal present in the composite synchronizing signal;
   a pulse shaper coupled to the line synchronizing circuit for producing a sampling pulse from said line reference signal, said sampling pulse occurring during a period of said line synchronizing signal and having a duration shorter than that of said line synchronizing signal; and
   a noise detector having a noise separating stage coupled to said video processing stage and said pulse shaper for detecting noise present in said incoming video signal during the occurrence of said sampling pulse, and an output stage coupled to said noise separating stage for generating a change signal in dependence on said detected noise, wherein said noise separating stage comprises means for differentiating the incoming video signal applied thereto forming a noise signal, and means for amplifying the noise signal.

2. A picture display device as claimed in claim 1, wherein said picture display device further comprises a field synchronizing signal separating stage connected to said synchronizing signal separating stage for separating a field synchronizing signal from the composite synchronizing signal, and a field synchronizing circuit connected to the field synchronizing signal separating stage for generating a field reference signal which is substantially synchronous with the field synchronizing signal, characterized in that the noise detector further comprises a counting device having threshold means coupled to said noise separating stage for generating a control signal each time the amplitude of said amplified noise signal exceeds a predetermined value, first means for counting a number of occurrences of said control signal and for generating an indexing signal when the number of occurrences of said control signal exceeds a first predetermined number, and means coupled to said field synchronizing circuit and to said first counting means for activating said first counting means for a period of time equal to the duration of a predetermined number of scanning lines in said incoming video signal, said output stage being coupled to said first counting means for generating said change signal in dependence on said indexing signal.

3. A picture display device as claimed in claim 2, characterized in that said counting device further comprises second means coupled to said first counting means and said field synchronizing circuit, for counting a number of consecutive field periods during which said first counting means generates said indexing signal, and for causing said output stage to generate said change signal when the number of consecutive field periods exceeds a second predetermined number.

4. A picture display device as claimed in claim 1, characterized in that the picture display device further comprises an integrator for suppressing high-frequency components in the incoming video signal applied to the noise separating stage.

5. A picture display device as claimed in claim 3, characterized in that said activating means comprises a pulse generator connected to the field synchronizing circuit for generating a window signal whose duration is equal to the duration of said predetermined number of scanning lines.

6. A picture display device as claimed in claim 5, characterized in that said first counting means comprises a first counter connected to said threshold means for counting the number of occurrences of said control signal, the first counter being connected to the pulse generator for receiving the window signal.

7. A picture display device as claimed in claim 6, characterized in that the indexing signal remains unchanged after the first counter has reached said first predetermined number.

8. A picture display device as claimed in claim 6, characterized in that the second counting means comprises a second counter connected to the field synchronizing circuit and to said first counter for counting the number of consecutive field periods in which the the first counting means generates said indexing signal, the second counter being connected to the output stage.

9. A picture display device as claimed in claim 8, characterized in that an output signal of the second counter remains unchanged after the second counter has counted said predetermined number of consecutive field periods.

10. A picture display device as claimed in claim 8, characterized in that the second counting means comprises a delay element for conveying the output signal of the second counter to the output stage during a field change occurring after the said predetermined number of consecutive field periods has been reached.

11. A picture display device as claimed in claim 1, characterized in that the output stage is connected to the noise separating stage for increasing a gain factor of the noise separating stage in response to the generation of the change signal.

* * * * *